(12) United States Patent
Haeufgloeckner (10) Patent No.: US 11,845,139 B2
(45) Date of Patent: Dec. 19, 2023

(54) APPARATUS AND METHOD FOR OPERATING A RESISTANCE WELDING APPARATUS

(71) Applicant: Robert Bosch GmbH, Stuttgart (DE)

(72) Inventor: Juergen Haeufgloeckner, Schneeberg (DE)

(73) Assignee: Robert Bosch GmbH, Stuttgart (DE)

( * ) Notice: Subject to any disclaimer, the term of this patent is extended or adjusted under 35 U.S.C. 154(b) by 1090 days.

(21) Appl. No.: 16/589,562

(22) Filed: Oct. 1, 2019

(65) Prior Publication Data
US 2020/0114460 A1 Apr. 16, 2020

(30) Foreign Application Priority Data

Oct. 16, 2018 (DE) ..................... 10 2018 217 670.1

(51) Int. Cl.
*B23K 11/11* (2006.01)
*B23K 11/25* (2006.01)

(52) U.S. Cl.
CPC ............. *B23K 11/257* (2013.01); *B23K 11/11* (2013.01)

(58) Field of Classification Search
CPC ......... B23K 11/00; B23K 11/11; B23K 11/25; B23K 11/257; B23K 11/125; B23K 11/24
See application file for complete search history.

(56) References Cited

U.S. PATENT DOCUMENTS 4,633,059 A * 12/1986 Sarugaku ............. B23K 9/0216
901/42
5,552,575 A 9/1996 Doumanidis
5,960,174 A * 9/1999 Dew ................. H04L 12/40143
709/208

(Continued)

FOREIGN PATENT DOCUMENTS

DE 93 17 013 U1 4/1995
DE 692 07 735 T2 9/1996

(Continued)

OTHER PUBLICATIONS

European Search Report corresponding to European Patent Application No. 19 19 3526, dated Mar. 30, 2020 (1 page).

*Primary Examiner* — Helena Kosanovic
*Assistant Examiner* — Ayub A Maye
(74) *Attorney, Agent, or Firm* — Maginot, Moore & Beck LLP (57) ABSTRACT

A resistance welding apparatus includes a welding controller configured to control a welding tool. The welding controller has an assignment device including a parametrization device. The assignment device is configured to read out a current point to be welded from a list of points to be welded, to read out a first setpoint curve from a record of a database assigned to the current point to be welded, and to assign the first setpoint curve to the first regulator and the parametrization device is configured to read out the first value from the record of the point to be currently welded and to parametrize a first parameter of the first regulator with the (Continued)

first value. The welding controller further includes the first regulator configured, using a first parameter, to regulate a temporal profile of an electric current at the current point to be welded in accordance with the first setpoint curve.

11 Claims, 3 Drawing Sheets

(56) References Cited

U.S. PATENT DOCUMENTS

| | | | | |
|---|---|---|---|---|
| 8,592,723 | B2 * | 11/2013 | Davidson | B23K 9/10 |
| | | | | 219/121.14 |
| 2002/0166842 | A1 * | 11/2002 | Grebenisan | B23K 11/25 |
| | | | | 219/86.41 |
| 2007/0221629 | A1 * | 9/2007 | Fernandez | B23K 11/252 |
| | | | | 219/110 |
| 2011/0198331 | A1 * | 8/2011 | Shigeyoshi | B23K 9/126 |
| | | | | 219/130.32 |
| 2015/0069030 | A1 * | 3/2015 | Haeufgloeckner | B23K 9/095 |
| | | | | 219/130.1 |

FOREIGN PATENT DOCUMENTS

| | | | |
|---|---|---|---|
| DE | 103 34 478 A1 | 3/2005 | |
| DE | 10 2006 038 768 A1 | 3/2008 | |
| DE | 10 2013 218 138 A1 | 3/2015 | |
| DE | 10 2015 225 050 A1 | 6/2017 | |
| DE | 102016226252 A1 * | 6/2018 | |
| EP | 2 246 760 A2 | 11/2010 | |
| JP | S47-037828 U | 12/1972 | |
| JP | 2012-095442 A | 5/2012 | |
| WO | WO-9200161 A1 * | 1/1992 | |
| WO | WO-03008146 A1 * | 1/2003 | B23K 11/253 |
| WO | 2006/042572 A1 | 4/2006 | |

* cited by examiner

APPARATUS AND METHOD FOR OPERATING A RESISTANCE WELDING APPARATUS

This application claims priority under 35 U.S.C. § 119 to patent application no. DE 102018217670.1 filed on Oct. 16, 2018 in Germany, the disclosure of which is incorporated herein by reference in its entirety.

The disclosure relates to a resistance welding apparatus, a database for a resistance welding device and a method for operating a resistance welding apparatus, as well as a database record for use with a welding controller.

BACKGROUND

Resistance welding is commonly used for producing a connection between two sheets of metal or metal parts. A resistance welding apparatus has two welding electrodes, between which a welding current flows. To perform the welding, currents of 5 kA to some 50 kA are usually used at welding voltages in the range from 1 to 2.5 V. The parts to be connected can be sheet metal plates with either the same or different types of metal and thicknesses. The individual welding operations take place in time windows in the range of up to one second. Longer durations are also possible, however. For example, in the course of automated vehicle bodywork assembly using robot-guided welding tools, different workpieces, such as metal sheets, are welded together by means of resistance welding.

From the prior art, for example the unexamined application DE 103 34 478 A1, a so-called adaptive control welding, in the following abbreviated to ACW, is known. In an ACW the process impedance is determined in the welding controller based on electrical parameters and compared with a stored or externally supplied target impedance. Depending on the comparison of the impedances a regulator referred to as a process controller controls the welding process.

The following is presented to provide a better understanding: the process impedance is made up of material resistances and contact resistances. The material resistances are dependent on the material and the condition of the welding electrodes, as well as on the two materials to be welded. The contact resistances result from the welding process itself, that is to say, in particular from the contacting surfaces, the resulting welding nugget or weld seam and from the impedance of the welding electrodes. The reference impedances stored externally in the welding controller are referred to hereafter as reference curves. The ACW uses the difference between the reference curve and a measured curve of the current welding operation and adjusts the welding current and welding time, in other words the setpoint curve for a current regulator, accordingly.

DE 10 2006 038 768 A1 discloses a method for determining the reference curve characteristic of a welding process to be carried out. The reference curve is generated by measurement during such a welding process during a constant current regulation, abbreviated in the following to CCR, which is also known as a non-adaptive operating mode, and is characteristic of the nature of the current welding operation.

Using resistance welding, as already mentioned, in the automated vehicle bodywork assembly different workpieces are welded together, for example metal sheets.

The problem with this is that multiple vehicle models with different model variants are manufactured on one production line and with one welding controller. Depending on how the vehicle models arrive on this line, a very wide range of sheet metal combinations are welded. The sequence of the vehicles is constantly changing. In parallel, the variance of the sheet metal combinations to be welded is increasing. Also, the coatings of the sheet metal are becoming increasingly varied and the necessary control of the resistance welding apparatus differs significantly between different coatings.

In the course of the production process of a single car body, up to several thousand welding to points (e.g. approx. 5,000 welding points for a mid-range vehicle) with several hundred different workpiece thickness and/or material combinations (e.g. approx. 700 combinations for a mid-range vehicle) are automatically processed. Welding controllers therefore obtain process control parameters—thus setpoints or setpoint curves—to control the welding process of the points to be welded, depending on the workpiece thickness and/or material combinations of the respective welding point. In the further course of this specification, for the workpiece material and/or workpiece thicknesses material combination, the term sheet/thickness combination or the abbreviation STC is used.

The patent application DE 10 2013 218 138 A1 by the applicant discloses a welding apparatus and a welding method in which such process control parameters for welded joints are stored in a storage medium of the welding controller. A record for a welded joint comprises a position on the workpiece and a sheet/thickness combination (STC). This sheet/thickness combination is assigned a further record independently of the position on the workpiece. This additional record comprises process control parameters, such as a current setpoint curve, a force or torque profile, a reference curve and possibly further reference curves.

From the patent application DE 10 2015 225 050 A1, which also originates from the applicant, a method is known for creating a database for performing welding processes. A database is created in which production data are sorted based on equal STC values. For each identical STC a specific record is created. In particular, the STC-specific data comprise process control parameters (such as welding current, current time, electrode force, and/or reference curves).

Despite ACW with STC-specific current setpoint curves and reference curves, there may be applications where the quality of the welding points is not stable. This is particularly relevant to the welding of aluminum sheet combinations with varying sheet thicknesses, because due to the high specific conductivity of aluminum alloys, the heat conversion is very low and the shunt effect is large. Also problematic is the welding of sheet metal combinations of galvanized steel.

It is the object of the disclosure therefore to provide a welding controller and a method for controlling a welding process, with which the welding process can be further improved. In particular, a welding controller and a method for controlling a welding process are to be provided, in which a more constant welding quality is achieved when welding with a welding tool for welded joints previously considered to be difficult.

SUMMARY

This object is achieved by a resistance welding apparatus having a welding controller for controlling a welding tool according to the disclosure. The object is further achieved by means of a database for a resistance welding apparatus according to the disclosure, a method for operating a resistance device according to the disclosure, and a record having the features of the disclosure.

The disclosure is based on the recognition that by welding point-specific adjustment of the parameters of the regulators of the welding controller the weld quality and repeatability of a weld can be significantly improved, including for welding connections considered to be difficult. In contrast to a process control parameter such as a current setpoint or a reference curve, a regulator parameter here means, for example, the gain of the proportional component Kp or the reset time $T_N$ of the integral component of a PI regulator. In welding controllers a current regulator of the welding controller regulates a predefined welding current for the welding of a point. The setpoint value is extracted from a record of a storage medium of the welding controller or an external database and then fed to the current regulator as a temporal setpoint curve by a specific device of the welding controller. This device of the welding controller is referred to as an assignment device.

According to the disclosure, a parametrization device is added to the assignment device. If the record is extended to include said parameters for the current regulator, the parametrization device can optimally adapt the parameters—in other words, the regulator parameters—of the current regulator to the STC to be welded. The welding process can be further improved. The adjustment of the parameters for the current regulator can be carried out in a very efficient way by the assignment device already existing in a welding controller. This requires that the data of the record for the STC of the joint to be welded are extended to include specific regulator parameters for the current regulator. Thus, for example, in a simple manner the regulator parameters proportional gain $K_P$ and/or the reset time $T_N$, but also other control parameters not explicitly mentioned here of the current regulator, can be optimally adapted to the specific STC. This means it is possible in a simple and very efficient way to perform the optimum adjustment and parametrization of the current regulator for each sheet/thickness combination to be welded. The wastage produced by the production plant due to faulty welded joints is reduced. In addition, an improved control of the welding process is possible, without the need for additional hardware, in particular without additional sensors.

These advantages also result in an analogous manner from the provision of a database having the features of the disclosure, from the provision of a method having the features of the disclosure and from the provision of a record having the features of the disclosure.

Advantageous additional designs are specified in the disclosure.

It is particularly advantageous to adapt the correction parameters of a process controller of the welding controller to the different STCs. Correction parameters here are understood to mean the control parameters of the process controller. The disclosure also makes it possible, in a simple manner, to adapt the correction parameters of the process controller to the sheet/thickness combination to be welded. For this purpose, the data of the record for the STC of the joint to be welded are extended to include data which indicate one or more correction parameters of the process controller individually for this specific STC. For example, by using the correction parameters an adjustment of the welding current and welding time can be controlled, as a response of the process controller to a deviation of an acquired parameter—such as current—from the corresponding reference curve. The welding process control and its parametrization is thus carried out as a function of the STC to be welded and not exclusively of a comparison of an actual and reference curve. This allows the welding process to be significantly further improved. In a simple and efficient way, it is possible to adapt the correction parameters of the process controller, such as the gain, i.e. by how much the current is adjusted in the event of a process deviation, and/or the gain of the current time extension, i.e. by how much the duration of the current flow is adjusted in the event of a process deviation, and/or the limit of the current adjustment, but also further correction parameters of the process controller not explicitly mentioned here, to the specific STC. For example, the welding of sheet metal combinations of galvanized steel requires a much smaller intervention of the process controller in terms of the welding current and welding time than the welding of sheet metal combinations of non-galvanized steel plates. Here the process controller can specify higher currents with a longer duration as setpoints to the current regulator. The diameter of the welding points for galvanized steel sheets is also smaller than for non-galvanized sheets, leading to increased wear on the welding electrodes. The higher energy input and the narrower tolerance band as well as the higher wear on the electrodes require a higher power from the current source, and an exact balancing of the control parameters for a dynamic control. This can also reduce, for example, the thermal and mechanical stress on the electrodes. The parametrization device of the welding controller parameters for each welding process adjusts the optimum correction parameter of the process controller specifically for the sheet metal/thickness combination currently to be welded. The basis for this approach is a set of knowledge stored in the database regarding the necessary welding process with regard to the correction parameters of the process controller. In accordance with the disclosure, the database or a record stored therein, provides a structure, for example in the form of designated tables or fields for recording values, in which the said knowledge is stored in the form of correction parameters—in particular adapted for the respective STC. In particular, by adjusting the parameters of the process controller to the STC, weld spatter can be prevented.

More modern or high-quality welding controllers comprise a drive regulator, in particular a force/torque regulator for the welding tool, e.g. for the closing drive of a welding gun. If the record of the STC is extended to include control parameters for the force/torque regulator, the force/torque regulator can be adapted specifically to the STC to be welded. By improving the dosing of the contact force, a deformation of the welding tool is counteracted and the welding electrodes can be precisely positioned. The welding process is further improved. Thus, for example, the parameters of gain $K_P$ and/or reset time $T_N$ of the force/torque regulator, but also other parameters of the force/torque regulator not explicitly mentioned here, can be optimally adapted to the specific STC in a simple manner. This means it is possible in a simple and very efficient way to perform the optimum adjustment of the force/torque regulator for each sheet/thickness combination to be welded. Particularly problematic are edge welds. In such an edge weld, the electrodes "slide" slowly down the side of the workpiece with the melting. This leads to a continuous power loss. The electrode drive constantly readjusts the amount of force, which causes overshooting in the regulation. If STCs specially created for edge welds and appropriate records for these STCs are provided, the control parameters of the force or torque regulator can be adapted advantageously and efficiently to these difficult welding processes. It is conceivable, in particular, to incorporate the position of the welding point on the workpiece into the parameter selection for the force/torque regulator. In this way, the quality of the welding process for edge welds can be improved.

BRIEF DESCRIPTION OF THE DRAWINGS

Further advantages and embodiments are obtained from the attached figures.

DETAILED DESCRIPTION

Figure 1:
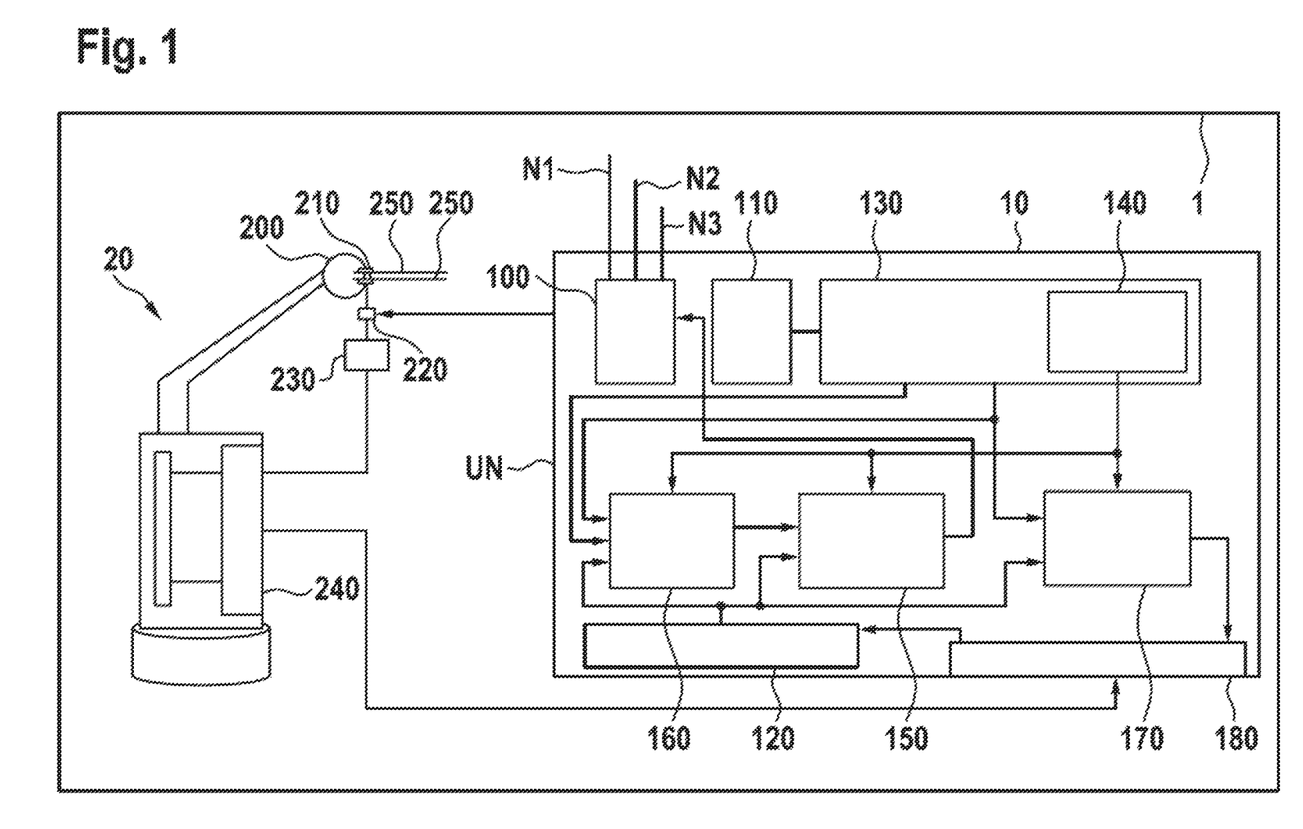
FIG. 1 is a schematic preferred configuration of a welding device according to the disclosure.

FIG. 1 shows a schematic view of a resistance welding apparatus 1. The resistance welding apparatus 1 comprises a welding controller 10 and a welding robot 20.

The welding controller 10 comprises a converter 100, a storage medium 110, an acquisition device 120, an assignment device 130 with a parametrization device 140, a current regulator 150 and a process controller 160, a force/torque regulator 170, and a communication device 180.

The welding robot 20 guides a welding tool 200, which is used to join the welded joint by means of a current flow on the sheets 250 to be connected, for example on a car body, with a material bond. The welding tool 200 comprises two welding electrodes 210 with electrode caps, not shown here. The welding tool 200 is implemented as a C-welding gun, but can also be an X-gun or other welding tool. The welding robot 20 further comprises a welding transformer 220, a measuring unit 230 and a communication device 240. With the measuring unit 230 the current flow through the welding electrodes 210, the voltage at the welding electrodes 210, the force that the welding electrodes 210 exert on the metal sheets 250 and/or the position of the welding electrodes 210 are measured. With the communications device 240, the data of the measuring unit 230 are transferred via the communication device 180 to the acquisition device 120 of the welding controller 10. The transfer can be carried out by analog as well as digital means, for example via a fieldbus, or else wirelessly.

The converter 100 of the welding controller 10 converts the three-phase mains voltage from the mains frequency into a voltage of a mean frequency, which supplies the welding to transformer 220 of the welding robot 20. The welding transformer 220 provides the welding current which flows via the welding electrodes 210 and the electrode caps, not shown, through the metal sheets 250 to be connected, and is used as a rectifier and a controllable current source. The size of the welding current is regulated by the current regulator 150 of the welding controller 10, which in turn controls the converter 100. As the setpoint for the current regulator 150 of the welding controller 10 a setpoint curve is used. The assignment device 130 reads a list of points to be welded from a record of the storage medium 110 or from an external database, not shown. The assignment device 130 then reads a record for the STC of the current point to be welded via referencing from the list of points to be welded. The record that is read out for the STC comprises a data field for the setpoint curve for the current regulator 150. The setpoint curve for the current regulator 150 is composed, for example, from segments of constant current profile which are connected by linearly rising or falling transition segments, and is described by the size of the currents with constant profile and by the slopes of the transition segments. The setpoint curve for the current profile can also be composed of value pairs consisting of time values and current values that are linearly interpolated by an additional interpolator, not shown, or of any combination of linear segments with transition segments and value pairs of time and current values.

The setpoint curve for the current regulator 150 is retrieved by the assignment device 130 and during the welding process is fed to the process controller 160 at its upper input as a current setpoint curve. In the non-adaptive CCR operating mode of the process controller 160, this setpoint curve is transferred unchanged to the current regulator 150.

In the adaptive ACW operating mode of the process controller 160 the difference between the current measured curve, which is fed from the acquisition device 120 to the process controller 160 at its lower input, and a reference curve, which is fed from the assignment device 130 to the process controller 160 at its central input, is evaluated and the setpoint curve for the current regulator 150 is adapted according to the process deviation. The manipulated variable of the process controller 160 is thus used as the temporal profile of the current setpoint for the current regulator 150. The manipulated variable of the current regulator 150 is a signal, in particular a pulse-width modulated signal, which is fed to the converter 100. The converter 100 controls the welding transformer 220 with an alternating current on its primary side. On the secondary side the welding transformer 220 is connected to the welding gun or the welding tool 200 on the welding robot 20. The measuring unit 230 of the welding robot 20 measures the electric current that flows through the welding electrodes 210 of the welding tool 200 and transmits these values via the communication devices 180 and 240 to the acquisition device 120. The actual value for the current regulator 150 is fed by the acquisition device 120 to the current regulator 150. The current regulator 150 has control parameters such as a gain $K_P$ adapted to the welding transformer 220 and/or a reset time $T_N$. The record read out by the assignment device 130 comprises these control parameters of the current regulator 150 also. The parameters are allocated to the current regulator 150 by the parametrization device 140 of the assignment device 130 before the current welding operation as current control parameters. Thus, in an advantageous way, it is possible to adapt not only the setpoint curve for the current regulator 150, but also the control parameters for the current regulator 150 to an STC of the current welding point with an advantageous setting of the control parameter or parameters of the current regulator 150. The current regulator 150 can have additional control parameters, not explicitly listed here. The record read out by the assignment device 130 comprises these control parameters also, and the parametrization device 140 assigns them to the current regulator 150 before the current welding.

A process controller 160 at a higher level than the current regulator 150 corrects the setpoint fed to the current regulator 150 and can compensate for deviations in the weld spot quality by adapting the welding process. The record read out by the assignment device 130 comprises at least one reference curve for this purpose. The said reference curve is used as a setpoint value for the process controller 160. The reference curve can be a curve of the impedance profile at the welding point recorded during a so-called reference weld. In addition or alternatively, the reference curve can also be the profile of a force exerted on the welding electrodes 210 and/or the position of the welding electrodes

210 during this reference weld. In this case the measuring signals represent the force or the distance changes that the welding process causes on the welding electrodes 210, due to the thermal expansion of the weld material and the sinking of the welding electrodes 210 into the molten weld material of the metal plates 250. The actual value for the process controller 160 is acquired by the acquisition device 120 and fed to the process controller 160. This actual value can be the impedance curve at the welding point and/or the force exerted on the welding electrodes 210 and/or the position of the welding electrodes 210 during the current welding operation. The process controller 160 has correction parameters such as the gain of the current setpoint correction $I_P$, the gain of the current time extension $I_T$, and/or the limit of the current adjustment $I_G$. The record read out by the assignment device 130 also comprises data fields for the correction parameters of the process controller 160. These values stored in these data fields are assigned to the process controller 160 by the parametrization device 140 before the current welding operation as a correction parameter. Thus, in an advantageous way it is possible not only to adapt the setpoint curves and/or the reference curves for the process controller 160 to an STC with an advantageous setting, but also the correction parameters of the process controller 160. The process regulator 160 can have additional control parameters, not explicitly listed here. The record read out by the assignment device 130 comprises these correction parameters also, and the parametrization device 140 assigns them to the current regulator 160 before the current welding operation.

A further regulator of the welding controller 10, a force or torque regulator 170 controls the force that the welding electrodes 210 exert on the metal plates 250 via their electrode caps, not shown. To this end the regulator 170 controls an electric drive of the welding tool 22, not shown. The force or torque regulator 170 can also be a drive regulator in a force or torque regulation operating mode. The record read out by the assignment device 130 also comprises a setpoint curve for the force or torque regulator 170. The setpoint curve is used as the temporal profile of the force or torque setpoint for the force or torque regulator 170. The setpoint curve for the force or torque regulator 170 is composed, e.g., from segments of constant force or torque profile which are connected by linearly rising or falling transition segments, and is described by the size of the forces or torques with constant profile and by the slopes of the transition segments. The setpoint curve for the force or torque profile can also be composed of value pairs consisting of time values and force or torque values, which are linearly interpolated by an additional interpolator, not shown, or of any combination of linear segments with transition segments and value pairs consisting of time values and force or torque values. The measuring unit 230 of the welding tool 200 measures the force that the welding electrodes 210 exert on the metal plates 250 and transmits these values via the communication devices 180, 240 to the acquisition device 120 of the welding controller 10. The actual value for the force or torque regulator 170 is fed by the acquisition device 120 to the force or torque regulator 170. The force or torque regulator 170 has control parameters such as a gain $K_P$ or a reset time $T_N$. The record read out by the assignment device 130 also comprises control parameters of the force or torque regulator 170. These values of the corresponding data fields of the record are assigned by the parametrization device 140 to the force/torque regulator 170 before the current welding operation as control parameters. Thus, in an advantageous way, it is possible to adapt not only the setpoint curves for the force or torque regulator 170, but also the control parameters for the force or torque regulator 170 with an advantageous setting of the control parameters to an STC. The force or torque regulator 170 can have additional control parameters, not explicitly listed here. The record read out by the assignment device 130 comprises these control parameters also, and the parametrization device 140 assigns them to the force or torque regulator 170 before the current welding operation.

The resistance welding process essentially consists of three phases. These three phases are usually referred to as the derivative time, current flow phase and hold time or cooling phase.

In the first phase, the so-called derivative time, the two welding electrodes 210 press together the metal plates 250 or metal sheets to be connected under the action of a force, which is provided by the drive of the welding tool 200, together. In this phase no current flows yet between the welding electrodes 210.

In the second phase, the current flow phase, the metal sheets 250 are heated by a current flow between the welding electrodes 210 and a melt is formed at the connection points by the heat generated by the current.

The third and final phase of the resistance welding process is the hold time or cooling phase. In this phase the melt cools down and solidifies, so that a non-detachable connection is formed between the sheets 250 or metal parts. Only after the melt has sufficiently cooled and, in particular, has solidified, the welding electrodes 210 are opened again by the drive of the welding tool and the now connected sheets 250 can be removed from the welding device.

By means of the three regulators, current regulator 150, process controller 160 and force or torque regulator 170, the welding controller 10 controls the necessary process for closing and opening the welding tool 200, the force applied to the sheets 250 by the welding electrodes 210, the current time, the current level and, where appropriate, the temporal profile of the current.

By means of the disclosure, an optimal adjustment of the regulators 150, 160, 170, of the welding controller to the respective specific sheet/thickness combination of the metal plates to be welded 250 with control parameters and correction parameters specially stored for this STC takes place in all three phases of the resistance welding process. This allows the resistance welding process to be significantly improved in relation to the duration and the required process stability.

Figure 2:
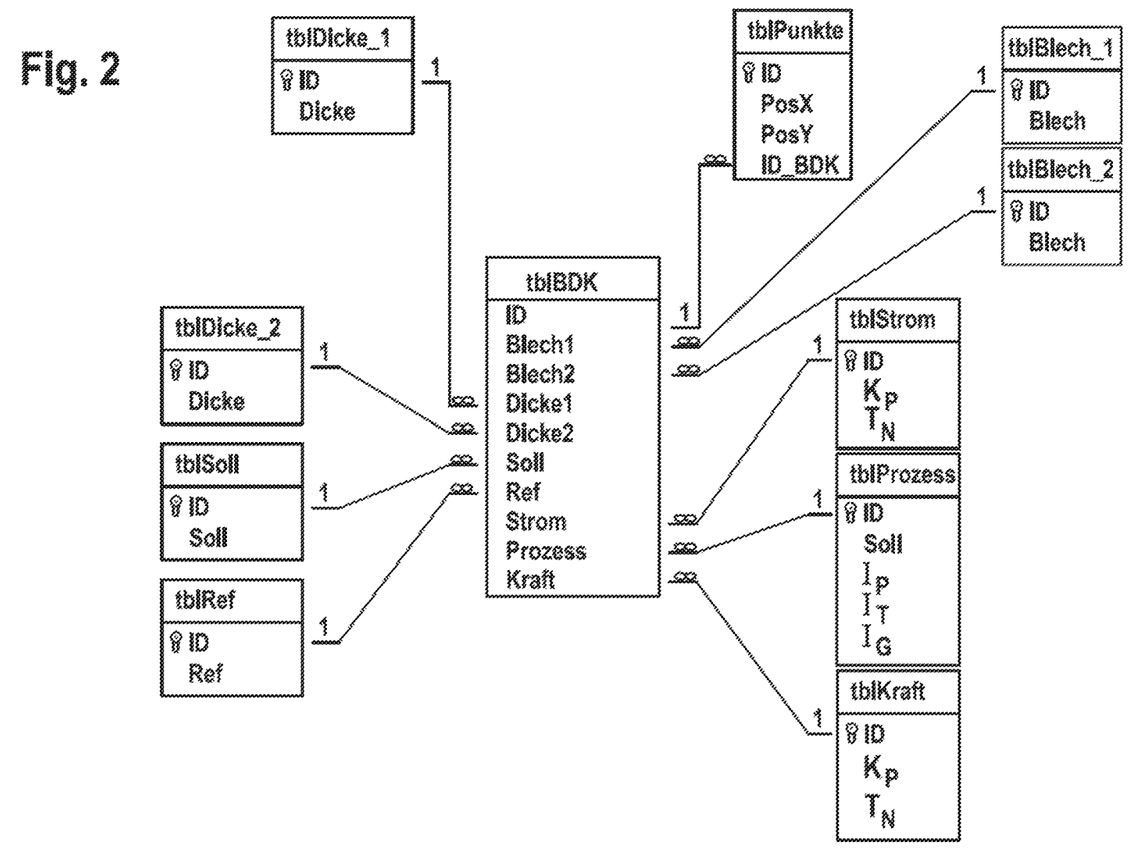
FIG. 2 is a graphical representation of a preferred configuration of a database structure according to the disclosure.

FIG. 2 shows the graphical representation of a database structure according to the disclosure.

In the figure, the tables, the data fields of the tables and the relationships between the tables of a relational database are shown.

The table tblPunkte contains records with the points to be welded. Each record is assigned to a position on the workpiece. Furthermore, the record references, via a 1:n relationship, a record in the table tblBDK, in which data are stored relating to the sheet metal thickness combinations that have been created and provided with setpoint curves and reference curves.

This record of the table tblBDK references records in the tables tblDicke, tblBlech, tblSoll, tblRef, tblStrom, tblProzess and tblKraft via further 1:n relations.

The table tblBlech describes the materials of the metal sheets 250 to be welded and the table tblDicke describes their thickness. For example, if two aluminum sheets with sheet thicknesses of 2 and 5 mm are welded, the data field Sheet1 and the data field Sheet2 reference the record for the material aluminum of the table tblBlech. Further, the data field thickness1 references a record 2 mm in the table tblDicke and the data field thickness2 references the data record for a sheet thickness of 5 mm from the table tblDicke. The sheet/thickness combination of the materials to be welded is thereby unambiguously described.

The records in the table tblSoll describe setpoint values, for example, a current setpoint curve for the current regulator 150, the records of the table tblRef describe reference curves for the process controller 160. The table tblSoll can also describe setpoint specification for a force/torque regulator 170 for the closing movement of the welding tool 200. A data record of the respective table is referenced via the data fields Setpoint and Ref of the table tblBDK.

According to the disclosure the other data fields of current, process and force in the table tblBDK reference the regulator parameters for the current regulator 150, correction parameters for the process controller 160 and regulator parameters for the force or torque regulator 170. By means of the values of the data fields of the three tables mentioned, the regulator or correction parameters of the respective regulators are adjusted. The retrieval of the values by the assignment device 130 or the parametrization device 140 is carried out with the aid of the STC assigned to the point to be welded and the reference contained therein to the data fields of the tables tblStrom, tblProzess and tblKraft, as shown in FIG. 2. Thus, in an advantageous way it is possible to adapt not only the setpoint curves for the current regulator 150 and/or force regulator 170, the reference curves for the process controller 160, but also the regulator or correction parameters for the current regulator 150, the process controller 160 and/or the force/torque regulator 170 to an STC, using an advantageous adjustment of the parameters of the particular regulator for the respective STC.

It is also conceivable to adjust the parameters for the current regulator 150 in accordance with the welding transformer 220 that is used. In the event of a change of welding transformer 220, a different set of regulator parameters can be set for the current regulator 150. For this purpose, an additional data field TrafoTyp, not shown here, can be included in the table tblBDK, wherein according to the welding transformer referenced therein the above-mentioned values in the table tblStrom are stored for the STC in variants customized to the welding transformer.

Figure 3:
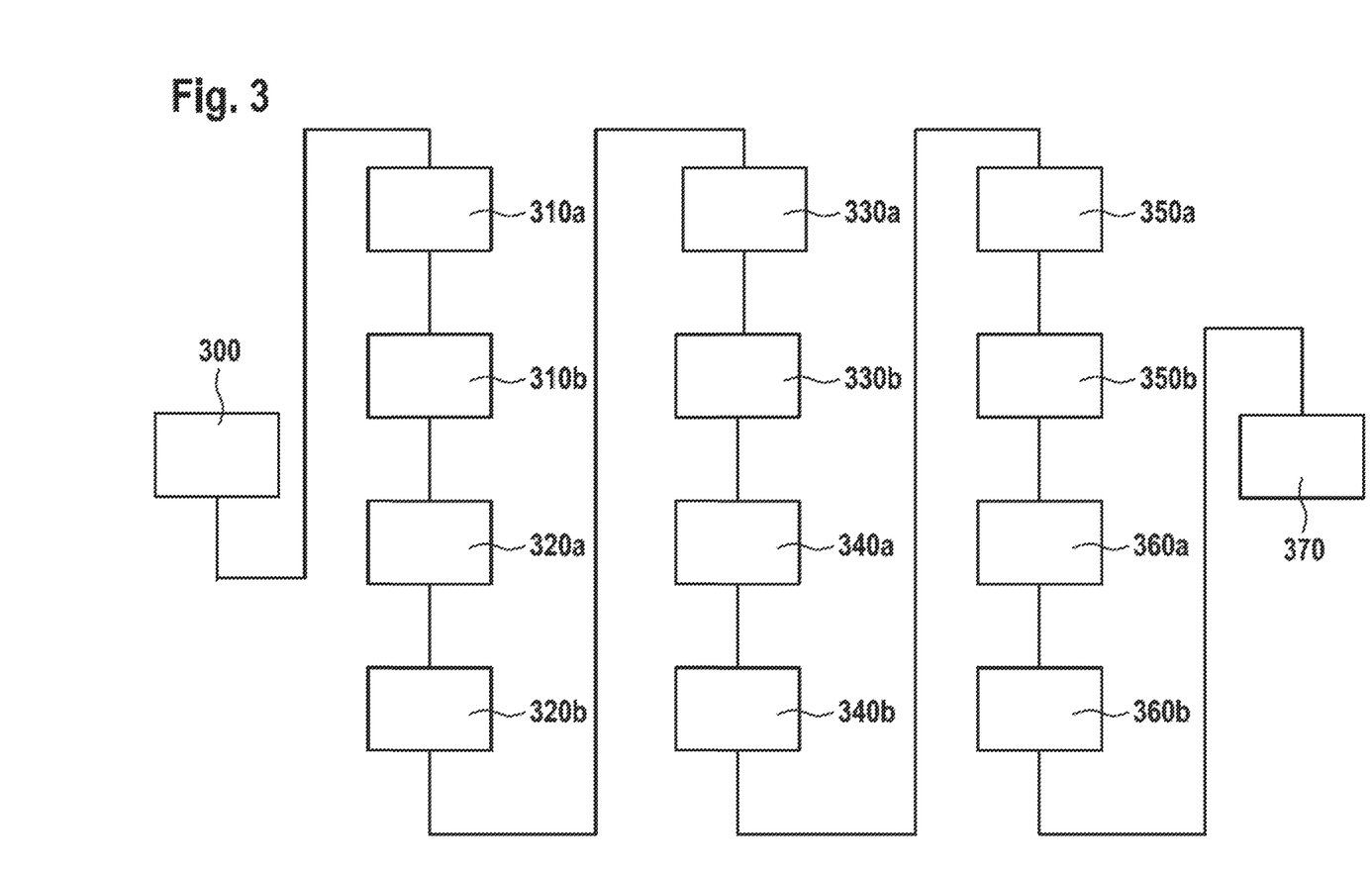
FIG. 3 is a schematic view of a preferred embodiment of the method according to the disclosure as a block diagram.

FIG. 3 shows a program flowchart of the method steps.

In a first step 300 of the method the current point to be welded is read out from the list of points to be welded by the assignment device 130. The current point to be welded is uniquely assigned an STC and therefore a record.

In step 310a of the method, the setpoint curve for the current regulator 150 is read from the record.

In step 310b of the method, the control parameters for the current regulator are read from the record.

In step 320a of the method, the setpoint curve is assigned to the current regulator 150.

In step 320b, the control parameters for the current regulator 150 are parametrized.

In step 330a of the method, the reference curve for the process controller is read from the record.

In step 330b, the correction parameters for the process controller 160 are read from the record.

In step 340a of the method, the reference curve is assigned to the process controller 160.

In step 340b of the method, the correction parameters for the process controller 160 are parametrized.

In step 350a of the method, the setpoint curve for the force or torque regulator is read from the record.

In step 350b, the parameters for the force or torque regulator 170 are read from the record.

In step 360a of the method, the setpoint curve is assigned to the force or torque regulator 170.

In step 360b of the method, the parameters for the force or torque regulator 170 are parametrized.

In step 370 of the method the regulation of the temporal profile of the electric current at the welding point, the acquisition of the temporal profile of the current, a voltage, a force and/or a position at the welding point with the acquisition device 120, the correction of the setpoint curve of the current regulator 150 by the process controller 160 and the regulation of the temporal profile of the force at the welding point are all combined by the force or torque regulator 170.

The present disclosure is therefore particularly advantageous for use in processes in which a plurality of welding points with complex, different sheet-thickness combinations STC are required to be welded. For example, this method is particularly beneficial for the vehicle bodywork assembly, especially for automated welding processes in vehicle bodywork assembly, preferably in the course of a motor vehicle production.

Further possible implementations of the disclosure also comprise combinations of features of the disclosure either described previously or in the following in relation to the exemplary embodiments, but which are not explicitly mentioned. A person skilled in the art will also be able to add individual aspects as improvements or additions to each basic form of the disclosure.

A resistance welding apparatus is disclosed, having a welding controller for controlling a welding tool,
the welding controller comprising
  an assignment device and
  a first regulator.
and the assignment device is configured to read out a current point to be welded from a list of points to be welded, to read out a first setpoint curve from a record in a database assigned to the current point to be welded and the to assign the first setpoint curve to the first regulator and
the first regulator is configured, by means of at least one first parameter, to regulate a temporal profile of an electric current at the current point to be welded in accordance with the first setpoint curve,
wherein according to the disclosure
the record in the database has at least one first value for the first parameter and the assignment device has a parametrization device, which is configured to read out the first value from the record of the point to be currently welded and to parametrize the first parameter of the first regulator with the first value.

LIST OF REFERENCE NUMERALS 1 resistance welding device
10 welding controller
100 converter
110 storage medium
120 detection device
130 assignment device
140 parametrization device
150 current regulator
160 process controller
170 force/torque regulator
180 communication device
20 welding robot
200 welding tool 210 welding electrodes
220 welding transformer
230 measurement device
240 communication device
250 metal sheets
tblPunkte Table of welding points to be welded
   ID Primary Key
   PosX X-position on the workpiece
   PosY Y-position on the workpiece
   ID_BDK foreign key to data record of the table tblBDK
tblBlech Table of sheet metal materials
   ID Primary Key
   Sheet material
tblDicke Table of sheet thicknesses
   ID Primary key
   Thickness sheet thickness
tblSoll Table of the Setpoints
   ID Primary Key
   Setpoint Description of the setpoint curve, e.g. setpoint current curve
tblRef Table of the reference curve
   ID Primary Key
   Setpoint Description of the reference curve profile
tblStrom Table of regulator parameters of the current regulator
   ID Primary Key
   $K_P$ Gain for the proportional component
   $T_N$ Reset time for the integral component
tblProzess Table of correction parameters of the process regulator
   ID Primary Key
   Ip Gain of the current setpoint correction
   It Gain of the current time extension
   Ig Limit of the current adjustment
tblKraft Table of regulator parameters of the force/torque regulator
   ID Primary Key
   $K_P$ Gain for the proportional component
   $T_N$ Reset time for the integral component
tblBDK Table of sheet thickness combination
   ID Primary Key
   Sheet1 first foreign key to record in the table tblBlech
   Sheet2 second foreign key to record in the table tblBlech
   Thickness1 first foreign key to record in the table tblDicke
   Thickness2 second foreign key to record in the table tblDicke
   Setpoint foreign key to record in the table tblSoll
   Ref foreign key to record in the table tblRef
   Current foreign key to record in the table tblStrom
   Process foreign key to record in the table tblProzess
   Force foreign key to record in the table tblKraft

What is claimed is:

1. A resistance welding apparatus comprising:
a welding controller configured to control a welding tool, the welding controller implementing:
   a current regulator;
   a process controller;
   an assignment device including a parametrization device, the assignment device configured to read out a current point to be welded from a list of points to be welded, to read out a first setpoint curve from a record of a database assigned to the current point to be welded, and to assign the first setpoint curve to the current regulator, and the parametrization device configured to read out a first value from the record of a point to be currently welded and to parametrize a first parameter of the current regulator with the first value; and
   an acquisition device configured to detect the temporal profile of the electric current, a voltage, a force and/or a position when the point is being welded and further configured to read out at least a first reference curve from the record of the database assigned to the current point to be welded and to assign the first reference curve to the process controller,
wherein the current regulator is configured, using the first parameter, to regulate a temporal profile of an electric current at the current point to be welded in accordance with the first setpoint curve,
wherein the process controller configured, using a first correction parameter, to correct the first setpoint curve provided by the assignment device to the current regulator based on deviations between the first reference curve and the temporal profile of the current, the voltage, the force and/or the position received by the acquisition device,
wherein the record in the database includes the first value for the first parameter and a second value for the first correction parameter, and
wherein the parametrization device is further configured to parametrize the first correction parameter of the process controller with the second value.

2. The resistance welding device according to claim 1, wherein the first parameter is at least one proportional gain of the current regulator or a reset time of the current regulator.

3. The resistance welding apparatus according to claim 1, wherein the first correction parameter is at least a gain of a current regulation of the process controller, a limit of a current adjustment of the process controller, or a gain of a current time extension of the process controller.

4. The resistance welding apparatus according to claim 1, wherein the welding controller further implements:
   a third regulator configured to control a drive of the welding tool and further configured to, using a second parameter, to regulate, using the drive of the welding tool, a temporal profile of a force or torque for the current point to be welded in accordance with a second setpoint curve,
wherein the assignment device is further configured to read out the second setpoint curve from the record of the database and to assign the second setpoint curve to the third regulator, and
wherein the record has a third value for the second parameter and the parametrization device is further configured to parametrize the second parameter of the third regulator with the third value.

5. The resistance welding apparatus according to claim 4, wherein the third regulator of the welding controller is a regulator of an electric drive of the welding tool, with a force regulation operating mode or a torque regulation operating mode.

6. The resistance welding apparatus according to claim 5, wherein the second parameter of the third regulator is at least a proportional gain or a reset time of the force regulator or of a torque regulator of a drive regulator of the electric drive of the welding tool.

7. A database for a resistance welding apparatus, comprising:
   a record having a primary key for a sheet/thickness combination, wherein the primary key is configured for assignment to a welding point, wherein the record is assigned to a setpoint curve for a current regulator of a welding controller, wherein the record is assigned to a first value for a first parameter of the current regulator of the welding controller, wherein the first value is at least one of a proportional gain or a reset time of a current regulator, wherein the record is assigned a first reference curve for a process controller of the welding controller and the record is further assigned a second value for a first correction parameter of the process controller of the welding controller, and wherein the resistance welding apparatus includes the welding controller configured to control a welding tool, the welding controller implementing:

the current regulator;

the process controller; and an assignment device including a parametrization device, the assignment device configured to read out a current point to be welded from a list of points to be welded, to read out a first setpoint curve from a record of a database assigned to the current point to be welded, and to assign the first setpoint curve to the current first regulator and the parametrization device configured to read out the first value from the record of a point to be currently welded and to parametrize the first parameter of the current first regulator with the first value, an acquisition device configured to detect the temporal profile of the electric current, a voltage, a force and/or a position when the point is being welded and further configured to read out at least a first reference curve from the record of the database assigned to the current point to be welded and to assign the first reference curve to the process controller, wherein the current regulator is configured, using the first parameter, to regulate a temporal profile of an electric current at the current point to be welded in accordance with the first setpoint curve, and wherein the process controller configured, using the first correction parameter, to correct the first setpoint curve provided by the assignment device to the current regulator based on deviations between the first reference curve and the temporal profile of the current, the voltage, the force and/or the position received by the acquisition device, wherein the record in the database includes the first value for the first parameter and the second value for the first correction parameter, and wherein the parametrization device is further configured to parametrize the first correction parameter of the process controller with the second value.

8. The database according to one of claim 7, wherein the record is assigned a second setpoint curve for a third regulator of the welding controller and the record is further assigned a third value for a second parameter of the third regulator of the welding controller.

9. The database according to one of claim 7, wherein the database is stored in a storage device of the welding controller.

10. The database according to one of claim 7, wherein the database is stored on a server, which the welding controller is configured to access.

11. The database according to claim 7, wherein a data record configured to be used with the welding controller and/or configured to be stored in the database has a structure that includes:

the primary key configured to allow an assignment of the record to the welding point from the list of welding points;

the setpoint curve configured to apply the current regulator of the welding controller; and an additional value defined for the parametrization of the current regulator of the welding controller and/or defined for the parametrization of a process controller of the welding controller.

* * * * *

UNITED STATES PATENT AND TRADEMARK OFFICE
CERTIFICATE OF CORRECTION

| | |
|---|---|
| PATENT NO. | : 11,845,139 B2 |
| APPLICATION NO. | : 16/589562 |
| DATED | : December 19, 2023 |
| INVENTOR(S) | : Juergen Haeufgloeckner |

It is certified that error appears in the above-identified patent and that said Letters Patent is hereby corrected as shown below:

In the Claims

In Claim 7, at Column 13, Lines 24-25: "the current first regulator" should read --the current regulator--.

In Claim 7, at Column 13, Line 27: "the current first regulator" should read --the current regulator--.

Signed and Sealed this
Eleventh Day of June, 2024

Katherine Kelly Vidal
*Director of the United States Patent and Trademark Office*